United States Patent [19]

Scholes et al.

[11] 4,444,834
[45] Apr. 24, 1984

[54] LUBRICATED METALLIC SUBSTRATE

[75] Inventors: Addison B. Scholes, Muncie, Ind.; David L. Dollar, Greeneville, Tenn.

[73] Assignee: Ball Corporation, Muncie, Ind.

[21] Appl. No.: 339,093

[22] Filed: Jan. 13, 1982

Related U.S. Application Data

[60] Continuation of Ser. No. 661,436, Feb. 26, 1976, abandoned, which is a division of Ser. No. 570,346, Apr. 22, 1975, abandoned, which is a continuation-in-part of Ser. No. 382,980, Jul. 26, 1973, abandoned.

[51] Int. Cl.$^3$ .................. B32B 3/10; B32B 15/20; B32B 15/04
[52] U.S. Cl. .................. 428/323; 428/327; 428/457; 428/461; 428/467
[58] Field of Search .............. 428/323, 327, 457, 461, 428/467

[56] References Cited

PUBLICATIONS

Cook, "Pre-coated Materials in High-Speed Press Work", *Sheet Metal Industries*, Jul. 1968, pp. 461–465, 472.

*Primary Examiner*—James R. Hoffman
*Attorney, Agent, or Firm*—Gilbert E. Alberding

[57] ABSTRACT

A new article of manufacture comprising an aluminum substrate has at least one surface coated with a lubricating material. The lubricating material is preferably a dielectric hydrocarbon deposited in particulate form by the method of electrostatically charging the particles so that they mutually repel one another, maintaining a quiescent cloud of such charged particles adjacent the surface to be lubricated, and depositing and distributing the charged particles onto the surface substantially entirely by electrostatic forces. The particles preferably have an average diameter of less than ten microns and are deposited to cover from about one percent to about fifteen percent of the surface in an amount of from about four milligrams per square foot to about 24 milligrams per square foot.

5 Claims, 15 Drawing Figures

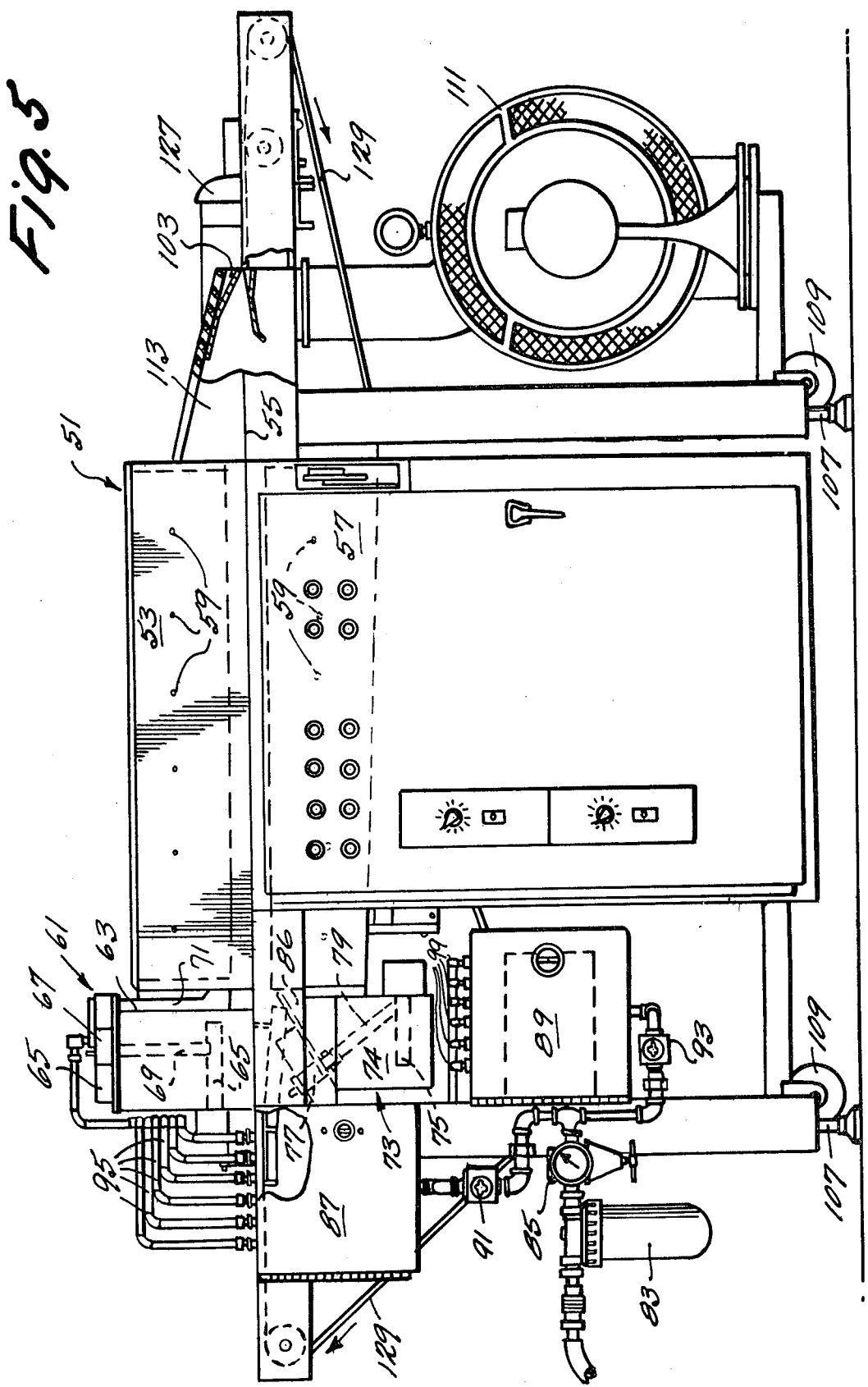

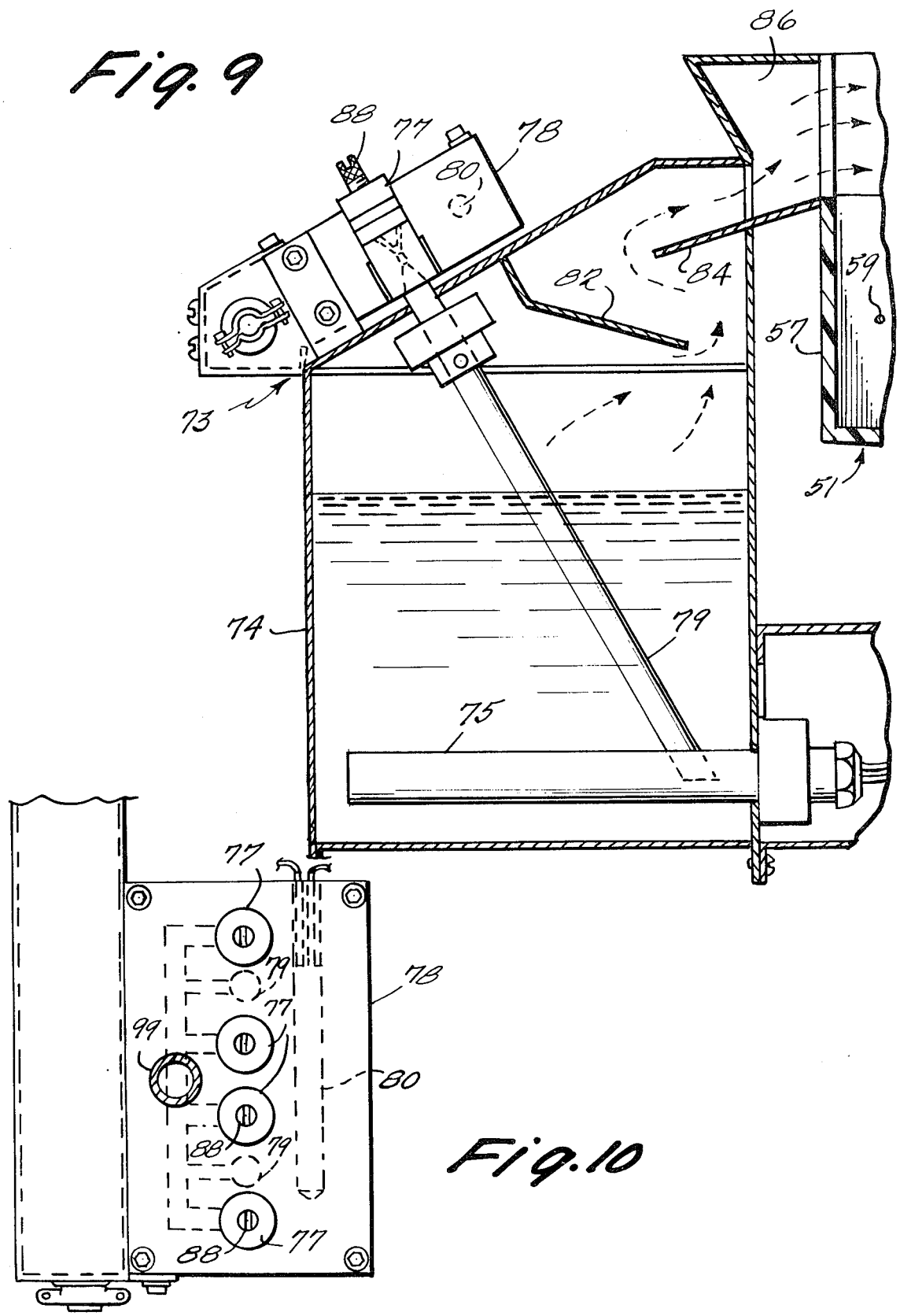

LUBRICATED METALLIC SUBSTRATE

This is a continuation of U.S. patent application Ser. No. 661,436 filed Feb. 26, 1976 (now abandoned); which is a division of U.S. patent application Ser. No. 570,346 filed Apr. 22, 1975 (now abandoned); which is a continuation-in-part of U.S. patent application Ser. No. 382,980 filed July 26, 1973 (now abandoned).

This application is also related to commonly assigned U.S. Pat. Nos. 4,066,803 and 4,170,193 of ourselves together with Robert L. Hurst.

This invention relates to a new article of manufacture and to a novel method and apparatus for providing such an article by electrostatically uniformly dispersing tiny spheroids of a lubricating material onto a conducting substrate.

In the production of metal cans and other articles of manufacture, it is often necessary to provide slight amounts of lubrication material upon the surface of metal stock (e.g. sheets, strips, etc.) before storing the metal, subjecting the metal stock to further forming operations, such as passing the stock through various forming dies, or for other reasons. Failure to apply lubrication prior to such forming operations results in severe scraping and galling of the dies, rendering them useless for continued service. In addition, failure to apply lubrication often results in deformed and defective finished articles for other reasons as known in the art. Also, as metallic surfaces are often processed with suitable ornamental effects, it is frequently desirable to provide the decorated metallic surface with lubrication immediately following the surface decorating process. Here again lubrication is required to enable the manufacturer to pass the decorated sheet or material through forming dies to punch and form the material without galling the dies or causing defective materials to be produced, etc. In all cases it is necessary to apply a fairly controlled amount of lubrication and to attempt to uniformly distribute it on the metal surfaces since excessive and/or uneven lubrication can and often does give rise to its own attendant problems as is also well known in the art. For instance, excessive wax lubrication not only wastes materials, it may accumulate on forming die surfaces and/or tend to "tack" or "weld" lubricated sheets together upon mutual planar contact.

In the past the most conventional method of applying lubrication upon common metallic surfaces in the form of flat sheets, strips, etc., was simply to pass the material through a solvent bath saturated with organic lubricating compositions. Upon emerging from the bath, the solvent is permitted to evaporate thus leaving the organic lubricating composition as a thin film upon the metallic surface. Major disadvantages of this conventional procedure are the apparent hazardous and often toxic situations due to solvent fumes in the vicinity of such an operation as well as the considerable expense of supplying large quantities of solvent material, preparing and applying the solvent solution, as well as other related disadvantages as known in the art.

Accordingly, there have been repeated attempts to improve on the conventional solvent bath technique. However, for a great variety of reasons, such attempts have heretofore met with eventual failure when put to the practical test of actual operating conditions with the result that lubrication of such metal substrates today is still primarily achieved via the costly and hazardous solvent bath technique and/or with other less costly or less hazardous attempts which usually fail to provide the desired lubrication application.

Now, with the discovery of this invention, it is possible to achieve a form of lubricated metal substrate not heretofor possible through method and apparatus which is cheap and inherently safe over the solvent bath technique while at the same time providing superior lubrication results. Cleaner die surfaces are maintained, less lubrication material per unit area is required and the tack or weld tendency of lubricated stock is reduced.

One prior approach to lubricating metallic surfaces involved the simple passing of the stock metal material under a bank of nozzles spraying lubricant directly upon the metal surfaces. However, such a direct spray process provides an excessively thick lubricating film which is typically non-uniform, thereby causing a great number of attendant problems as is recognized in the art.

A great number of prior attempts have been made to harness electrostatic deposition techniques for applying the necessary lubricant to the metal substrate. However, none of these prior attempts is believed to have been very successful. Some metal manufacturing facilities are known to have made costly investments in electrostatic apparatus purportedly designed for the purpose of applying lubrication to metal substrates only to abandon same in favor of the more conventional solvent bath or direct spraying techniques and/or to conclude that the "electrostatic" lubricator appeared to work about as well with the electrostatics turned off as when the electrostatics was turned on.

Evaluating the known prior electrostatic lubricator attempts in light of our present discoveries it appears that such prior attempts have failed to properly consider the detailed physical and electrical processes being attempted and have thus failed to properly provide suitable method and apparatus capable of fully facilitating same.

The present invention has proven capable of very successful practical performance in an actual manufacturing environment. While all the reasons for this noted success may not yet be known or fully appreciated, it is presently believed that the following attributes of our invention are important in varying degrees to its noted improved performance:

(1) method and apparatus is provided for forming substantially uniform liquid lubrication particles, the majority of which are uniformly sized to have an average diameter on the order of one micron to insure that the resulting mist cloud of particles (spheroids due to liquid surface tension) is completely airborne with resulting particle movements that are substantially independent of any gravity forces acting thereon;

(2) a completely non-electrically conducting enclosure is provided to substantially eliminate any electrostatic forces tending to attract lubrication particles towards the enclosure walls rather than towards the conducting substrate as desired;

(3) a charged plasma of ambient gaseous molecules is maintained within the non-conducting enclosure by impressing a high voltage difference between electrodes therein and the conductive substrate of metal rather than between two sets of electrodes;

(4) the airborne mist cloud of spheroids is allowed to migrate or drift into the plasma area where multiple ion collisions charge the relatively larger spheroids in a relatively slow charging process which, as it approaches a steady state condition, will eventually impart substantially uniform maximum electrical charges on all the available uniformly sized spheroids which are thereafter uniformly attracted towards and uniformly dispersed upon the metal substrate;

(5) since this process is substantially 100% efficient in steady state, the percentage coverage of the metal surface is determined primarily only by the quantity of spheroids supplied to the plasma and the rate of movement of the metal substrate (hence its dwell time within the non-conducting coating chamber); and (6) complete lubricant film coverage of the metal substrate is not attempted but, rather, only a uniform dispersement of lubricant spheroids thereover;

(7) many other features as will be apparent from the description hereinbelow.

There are, of course, still many further indications of difference between our invention and the prior electrostatic lubrication attempts as will occur to those skilled in the art.

The presently known prior attempts at electrostatic application of lubricant materials to metal strips or sheets are described in the following prior issued U.S. Pat. Nos. which were considered prior to filing this application: 2,447,664—Pegg (1948), 2,710,589—Brunner (1955), 2,762,331—Henderson (1956), 2,764,508—Feick (1956), 2,994,618—Landgraf (1961), 3,726,701—Nishikawa et al (1973).

There are of course other prior art patents relating generally to the electrostatic deposition of particles onto a metallic substrate (e.g., U.S. Pat. No. 3,155,545—Rocks et al [1964] relating to electrostatic coating of dust particles to a metal pipe surface). However, the above-noted patents are believed to be more pertinent to the present invention.

This invention relates to a method and apparatus for uniformly electrostatically dispersing lubrication particles onto a conductive substrate. In the exemplary embodiment, a lubricant, which is preferably solid at room temperature, is heated to form a liquid. The liquid lubricant is then sheared within an air fed orifice into an airborne mist of droplets directed downwardly towards an underlying liquid supply. Larger droplets are filtered out of the air flow by gravity, baffles, air flow forces and inertia effects to leave only a mist cloud of extremely small, substantially uniformly sized, spheroid particles, the majority of which have average diameters on the order of one micron and which are substantially independent of gravity forces. This mist cloud is then migrated or drifted toward an enclosure and preferably a non-electrically conducting enclosure having a plurality of electrodes therein. Corona discharge from the electrodes produced by a voltage difference maintained between the electrodes and the metal substrate causes the atmosphere within the enclosure to, in effect, become a plasma of ions, i.e., charged molecules of the ambient gases. The mist or cloud of lubricating spheres is introduced into the plasma as a migrating sheet cloud permitting each particle to randomly move and collide with ions in the plasma thus acquiring a charge from the relatively smaller ions. Due to the relatively slow random movement and the uniformly small size of particles, they will all eventually acquire a substantially uniform maximum electrical charge giving rise to electrostatic forces which uniformly disperse the particles onto the conducting substrate passing through the nonconducting chamber to form a uniform, substantially random distribution of lubricating spheres over at least one surface of the conductive substrate. In the preferred embodiment, the lubricant spheroids become frozen to a solid state before being dispersed onto the metallic surface. Uniformity of distribution of the spheres on the conductive substrate is insured because the particles are uniformly small and permitted to rather slowly migrate about the nonconducting chamber long enough to acquire uniform maximum electrical charges sufficient to strongly adhere same to the conductive substrate while at the same time repelling one another to thereby prevent coalescing of the particles. Since this process is substantially 100% efficient, the percentage coverage of the tiny lubricating spheres on the conducting substrate is dependent only upon the quantity of particles supplied to the chamber and the relative velocity of the substrate (hence its dwell time in the enclosure).

Accordingly, one aspect of the present invention provides an electrostatic method and apparatus for applying a uniform distribution of finely divided particles upon a metallic substrate.

Another aspect of the present invention provides an electrostatic precipitation method for depositing resinous and resinous-like materials on metallic substrates.

From another aspect, the present invention provides an improved process and apparatus for economically coating metallic substrates with wax and wax-like material by electrostatic means.

It is still another aspect of this invention to provide a process and apparatus which will deposit finely divided organic lubricating particles of relatively high molecular weight on metallic substrates without the occurrence of concentrated spots or areas thereon.

Another aspect of the instant invention provides a novel article of manufacture produced by electrostatic means, the article having uniform distribution of discrete particles of lubricant affixed to a metallic substrate.

Another aspect of the instant invention provides a lubricated substrate which requires far less lubricating material than the prior art.

Another principal aspect of the subject invention provides an article of manufacture that has a markedly reduced tendency to tack or weld upon being placed together upon mutual planar contact.

Another principal aspect of the present invention provides a novel lubricated substrate which has less tendency of accumulating lubricant material upon dies, jigs, and associated fixtures during forming operations than produced by conventional lubricating means.

Briefly, in accordance with this invention, a method is herein described for applying a lubricating material upon a metallic substrate in a finely divided form. This method comprises forming a mist of finely divided particles of said lubricating material, the particles of said material having an average size of less than 10 microns in diameter, passing the particles into a second containing means having an electrostatic field while maintaining the particles within a closely confined space within the electrostatic field whereby said particles are charged therein, and conveying the metalllic substrate through said first and second containing means as to electrostatically deposit the lubricating material upon said substrate.

One exemplary apparatus of this invention is designed to apply a uniform distribution of finely divided particles upon a metal substrate and comprises: means for generating a mist of lubricating material in the form of droplets having an average particle size of less than about 10 microns diameter, first means associated with said generating means for containing the mist of finely divided particles within a closely confined space, second means adjacent said first means for containing said mist and including means for impressing a high direct current potential across the substrate and at least one pair of electrodes opposingly situated adjacent said second containing means, said electrodes extending transversely the width of the metal substrate and defining an electrostatic field, and means for advancing the substrate through said field.

The term lubricating material denotes herein low-melting organic mixtures or compounds of relatively high molecular weight which are normally solid at room temperature and generally similar in composition to fats and oils. Although this generally embraces the hydrocarbons and more particularly the paraffinic hydrocarbons, other compounds such as esters or fatty acids and alcohols are also included. Generally such substances are non-toxic in nature and are free from objectionable odor and color. These lubricating materials are generally combustible, and have good dielectric properties. Further, the lubricating materials may be divided into two groups, natural and synthetic. The natural lubricating materials include beeswax, lanolin, shellac wax, carnauba, petroleum waxes including paraffin, microcrystalline wax, and petrolatum. The synthetic waxes include ethylenic polymers and polyol ether-esters including polyethylene glycols and methoxypolyethylene glycols and sorbitol, chlorinated naphthalenes and various hydrocarbon types produced by synthetic means such as the Fischer-Tropsch.

Other objects, features and advantages of the present invention will become more fully apparent from the following detailed description of the preferred embodiment, the appended claims and the accompanying drawings in which:

FIG. 5 is a side elevation view of an alternate, presently preferred exemplary embodiment of the present invention;

FIG. 9 is a section view of the lower mist forming exemplary apparatus of the present invention;

FIG. 10 is a partial plan view of the exemplary mist forming apparatus illustrated in FIG. 9;

Figure 14:
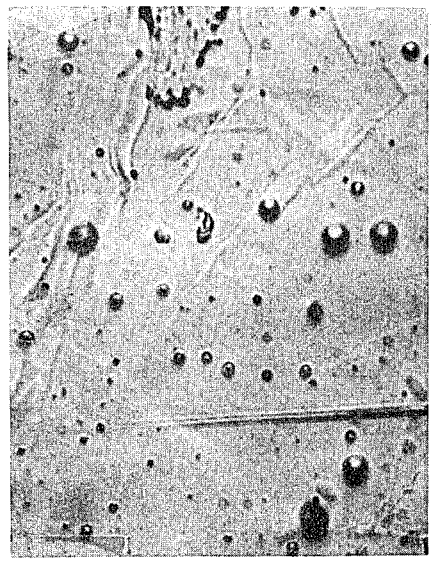
Figure 15:
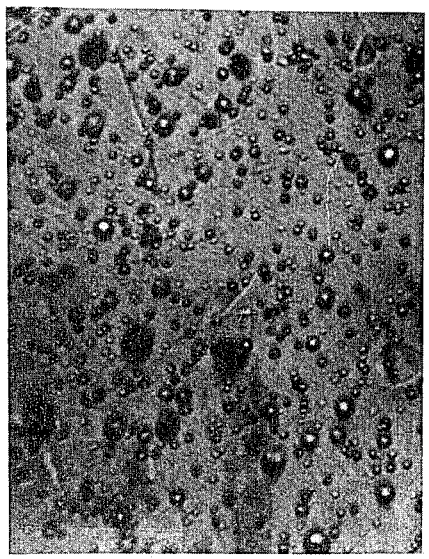

FIG. 14 is a photo illustrating new article of manufacture resulting from this invention and showing the density and substantially uniform distribution of solid spheres of lubricant onto a tin plate conductive substrate formed while the tin plate was moving through the lubricating apparatus at 300 feet per minute and when 50 cubic feet per hour of air is introduced into the mist generators of the apparatus of FIG. 5 to produce the mist cloud that is slowly migrated into the non-conducting precipitation enclosure; and FIG. 15 is a photo of the new article of manufacture showing solid spheres of lubricant deposited on a tin plate while the plate was moved through the lubricating apparatus at 45 feet per minute and when 50 cubic feet per hour of air was being introduced into the mist generators of the FIG. 5 embodiment.

Figure 1:
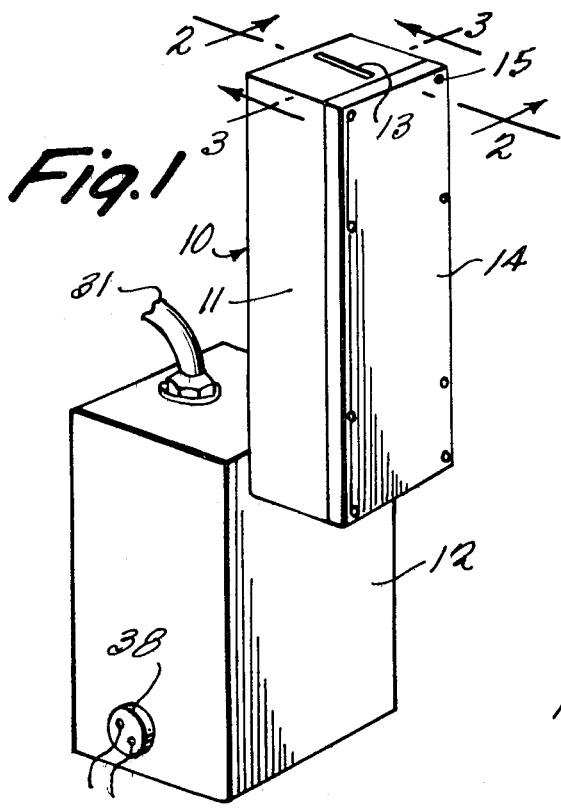
FIG. 1 is a perspective view of lubricating apparatus and auxiliary equipment constructed according to one exemplary embodiment of the present invention.

Turning now to the drawings and particularly FIG. 1, an electrostatic lubricating apparatus 10 is shown having an electrostatic chamber 11 affixed to a generator 12 provided with generating means to form a mist of lubricating material and communicating the same to the electrostatic chamber 11. The chamber 11 is provided with a pair of slots 13 situated centrally of the chamber 11 through which pass a substrate to be coated. A removable panel 14 is held in place to electrostatic chamber 11 by a series of connecting bolts 15.

Figure 2:
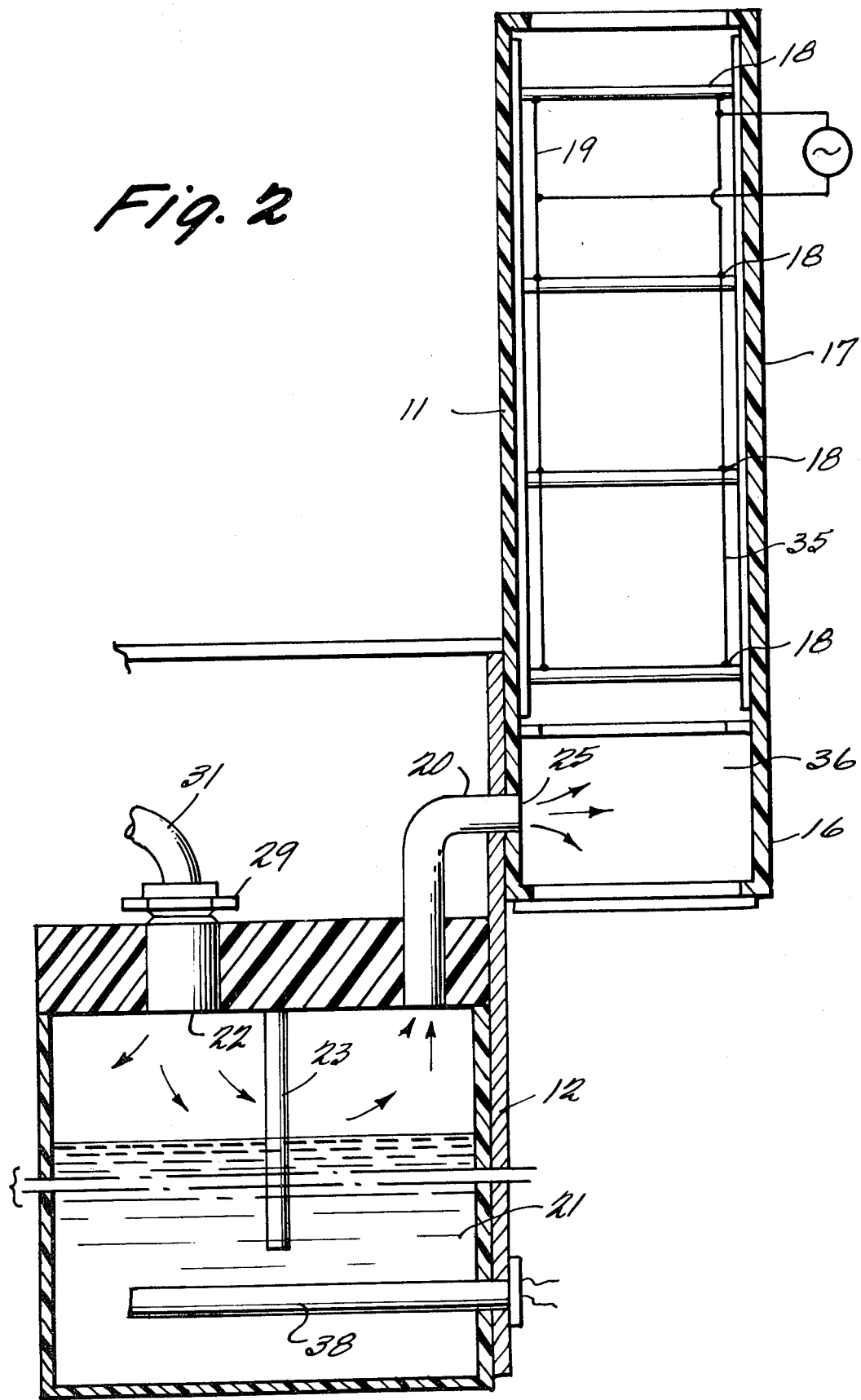
FIG. 2 is a cross-sectional view of the exemplary electrostatic lubricating apparatus taken along the line 2—2 of FIG. 1.

FIG. 2 shows in more detail a cross-sectional view of the electrostatic lubricating apparatus of FIG. 1. The electrostatic chamber has a lower portion 16 and an upper portion 17, the latter portion containing four pairs of electrodes 18 evenly distributed therein. The electrodes 18 extend transversely the width of the upper portion 17. Electrodes 18 are connected through suitable circuitry via line 19 which impresses a high direct current potential across the substrate 24 and the pairs of electrodes opposingly situated within upper portion 17. Electrostatic chamber 11 is connected to the generator 12 by suitable clamping or connecting means (not shown). A conduit 20 is provided on either side of substrate 24 to communicate from the generator 12 directly into the lower portion 16 of chamber 11. Generator 12 is provided with a reservoir 21 of lubricating material. The generator 12 is provided with an atomizing unit 22 having hollow tube 23 depending therefrom and being partially situated beneath the reservoir 21 of lubricating material. Generator 12 may be provided with heating means 38 to maintain the lubricating material in a fluid condition.

Figure 3:
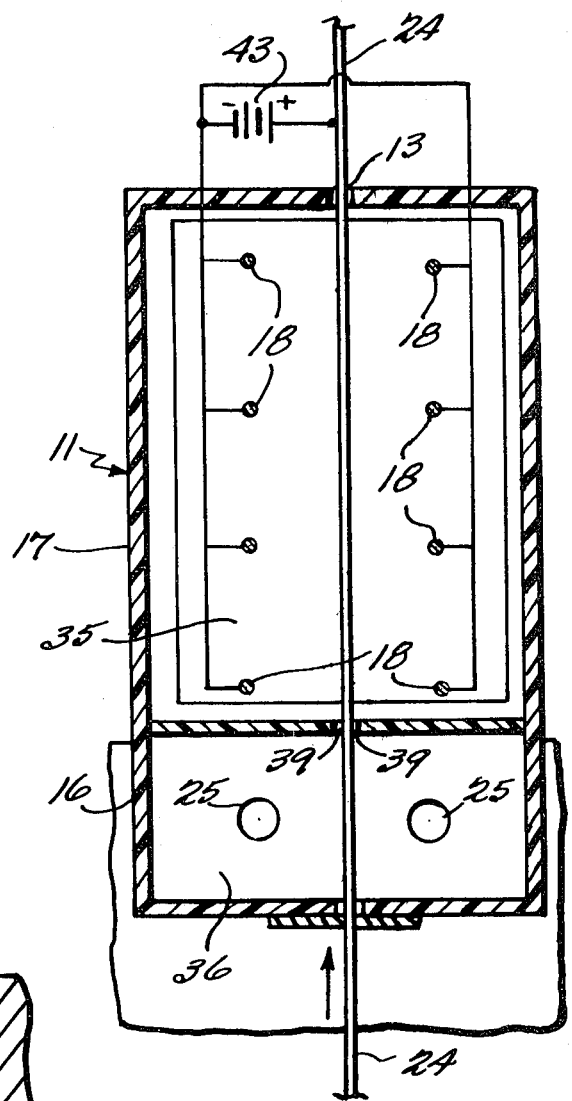
FIG. 3 is a cross-sectional view of the exemplary electrostatic chamber taken along the line 3—3 of FIG. 1.

FIG. 3 shows a cross-sectional view of the electrostatic lubricating chamber 11. The electrodes 18 are shown within the upper portion 17 and positioned in pairs at equal distance from the substrate 24 to be lubricated. The lower portion 16 shows two openings or headers 25 spaced from the substrate 24. A mist of finely divided lubricating material is introduced into the lower portion 16 via header 25 which produces an even distribution thereof across the full width of the substrate 24.

Figure 4:
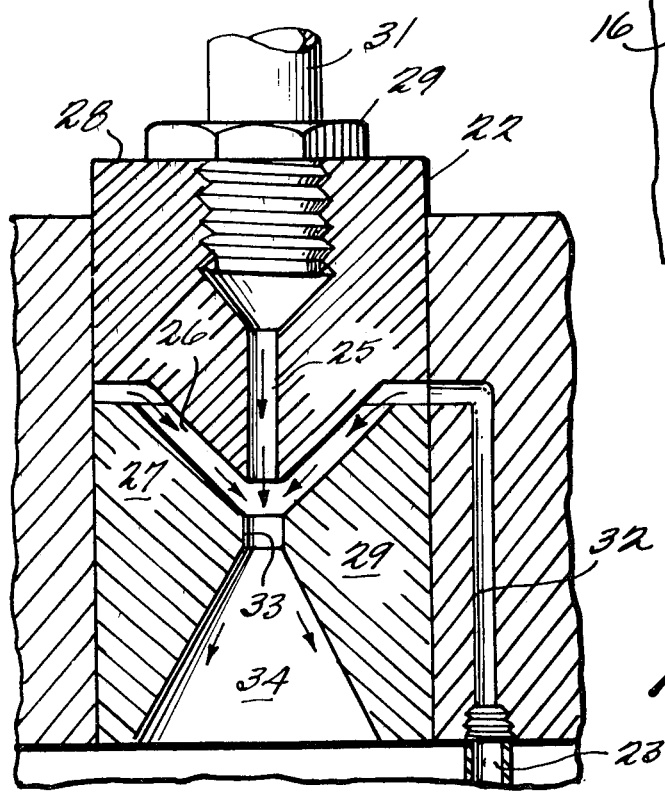
FIG. 4 is a section view of an exemplary venturi atomizer utilized to form a mist of lubricant particles.

In FIG. 4 a conical opening 26 formed between an hourglass plug 27 and keyed member 28. Tubing 31 is joined by locking nut 29 to keyed member 28 to provide communication into the apex of conical opening 26 via passage 30 situated in member 28. The tube 23 communicates into an inlet orifice 32 which leads into the conical opening 26 at its upper surface. The apex of the conical opening 26 terminates into a cylindrical section 33 which in turn communicates downwardly to a funnel shaped mouth 34.

In the operation of the apparatus described, the metallic substrate 24 moves upwardly and centrally through the slots 13 into the electrostatic chamber 11. Chamber 11 is preferably made of a transparent or translucent thermoplastic material which adequately insulates the substrate 24. The portion of the substrate 24 moving through the electrostatic chamber 11 first encounters the lower portion 16 having space 36 into which issues through headers 25 a mist of finely divided lubricating material which passes through slots 39 into a second space 35 formed by the upper portion 17 of chamber 11. Generally, the volume encompassed by space 35 is at least four times the volume encompassed by space 36. The mist is charged as it passes through an ionization field around the electrodes 18 thereby establishing a precipitating electrostatic field which causes the particles to be charged and to be drawn onto the metallic substrate 24. In the preferred embodiment the distance between the substrate 24 and the electrodes is approximately 3 inches. The mist of lubricating material is formed by passing compressed air supplied through tubing 31 directly into passage 30 wherein, drawn by the venturi, the lubricating material is reservoir 21 moves upwardly through a tube 23, and thence to orifice 32 and then into the conical opening 26 to be forcefully issued through section 33 and outwardly through the mouth 24 to the space 35 of generator 12. The mist then passes over the reservoir 21 of lubricating material, through conduit 20 and outwardly through headers 25 into the space 36.

Various metals may be utilized as the substrate in accordance with this invention, including aluminum, iron, copper, tin, and sundry alloys thereof. The apparatus and method of this invention may be used on various forms of the metal, especially when in coil stock form, generally from six to twenty-six inches wide and varying in thickness from 0.1 to 0.001 inch in thickness. It is often advantageous to incline the electrostatic lubricating chamber to properly accommodate the various coil stock configurations. Generally, an angle of about 20 to 45 degrees from the vertical may be used. The linear speed of the metallic substrate may vary over a wide range in accordance with numerous factors known to those skilled in the art. Generally, the speed may range from 25 feet per minute to 400 feet per minute. Preferably with most metallic substrates the linear speed should range between 70 and 250 feet per minute.

A number of factors influence the lubricating material deposition relationships. Thus by regulating the air or other gas to the atomizer an increase or decrease in the amount of deposition may be achieved. Also, the amount of deposition may be readily controlled by regulating the speed of travel, design of the venturi structure, type of oil used, etc.

The novel article of manufacture in accordance with the invention herein disclosed relates to a metal substrate upon which is substantially uniformly dispersed thereover numerous, discrete preferably spheroidal-shaped particles of solid lubricant material. An important aspect of said article of manufacture formed in accordance with the subject invention is that said article offers discrete, multi-point lubrication heretofore not available to the art. In general for a given weight of lubricating material a multi-point lubricated substrate as disclosed herein renders a relatively small but important effective area comprising discrete points of contact between two parallel planar metallic substrate surfaces as compared with the conventional continuous or film type of contact that presents a relatively larger area of such contact. This latter feature of achieving a relatively small effective area of mutual planar contact is essential to avoid tacking or the tendency to weld. Thus, in accordance with this invention lubricated stocks have a markedly reduced tendency to cling together, a problem which has been common in numerous coiling and sheeting operations.

Although the apparatus in accordance with this invention provides deposition on both sides of a substrate it will be appreciated that the lubrication may be applied to a single side by blocking one of the headers and not allowing current to be passed to the electrodes on one side of the electrostatic chamber.

As the mist or cloud of fine solid spheres or lubricant migrate toward and into the ionization field they are caused to be charged. The solid spheres assume random distribution since they acquire a like charge and repel one another and therefore remain independent of one another. Thereafter, the charged particles in the form of a mist or cloud are drawn at once to the conducting substrate having opposite charge where they are attached to and uniformly and randomly dispersed onto said substrate. It is believed that upon reaching and making contact with the conductive substrate the finely divided charged particles lose or dissipate their charge. Further, it is postulated, but the invention is not to be assumed restricted thereby, that the particles still retain for a very brief period of time a surface charge on the particles prior to loss or dissipation of charge. This is believed to be the case since there is seemingly very little particle-to-particle contact observed in a conducting substrate so treated. Note here, in particular FIGS. 14 and 15 herein. Of course, other randomly dispersed particles within the field of attraction will be drawn to the conductive substrate with the effect that some particles will fall proximate and very close to the particles already attached upon the conducted substrate while others will fall upon the substrate at random points spaced from the already attracted and attached particles. Owing to the random distribution of the cloud of particles the net result is that they are deposited in a random distribution on the substrate. Such a distribution is by its nature a uniform one.

An important feature associated with the subject lubricated article in accordance with the invention herein is the fact that superior lubrication results therefrom. In particular, it is noted that there is produced no tacking of sheets or coiled metal surfaces, i.e., the tendency of lubricated stock to adhere or weld themselves together. This particular disadvantage overcome by the material and method disclosed herein is one which has plagued the industry in cutting and dieing operations where more than one sheet may be introduced into the forming operation resulting in malfunction and misalignment. As to this invention, the sheets are easily separated due to air pockets or areas of which there is no lubricant. In effect, the uniform distribution of finely divided spheroidal shaped particles over the substrate allows for the formation of air pockets when planar sheets are stacked or sheets are coiled upon themselves and therefore render an easy removal or separation of one substrate from that of the adjacent substrate prior to the aforementioned forming operations.

It may be mentioned that the plurality of spheroidal shaped particles dispersed over a given surface cling to the substrate and are not easily removed therefrom. Thus, upon blowing air over the surface, mechanical agitation of such a treated substrate, or the ordinary handling of such lubricated materials it is observed that the spheres remain emplanted and attached thereto. It is hypothesized that the finely divided spheres being very tiny are bonded tenaciously to the surface by various physical forces including van der Waals forces or the like.

In the conventional technology of lubrication of a substrate such as lubricant/solvent dips and lubricant spray systems there is generally produced a continuous film of lubricating material. It is readily apparent that this lubricated material so-formed upon standing would set up or assume a rigid shape with the result that the substrate, upon being changed in configuration such as upon uncoiling, would exceed its fracture limitation and cause minute cracking resulting in loss of lubricant from the substrate. Apparently, flaking of lubricant in various degrees is often noted in substrates treated via conventional processes. It should be appreciated that the flaking of lubricant often results in excessive lubricant build-up in certain areas and that flakes of lubricant fall into portions of substrates which may cause undue build-up of lubricant and problems in the forming operation. This often times happens in conventional solvent-lubricant spray systems in that large concentrations or globs of lubricant are produced in certain areas where other areas are of light concentration. Furthermore, in conventional hot lubricant spray technology it is often discovered that there are areas of lubricant-free surfaces which of itself presents potential problems in forming operations. In order to compensate for this, it is often the practice to use more lubricant to achieve a continuous although uneven distribution of lubricant. However, when attempting to apply more lubricant to the substrate it is observed that excessive amounts of lubricant are found and accumulate on critical forming, tooling surfaces and edges which build-up and often times cause further problems. Thus, in accordance with this invention there is no requirement for frequent cleaning the forming tools, die equipment, etc., as often associated with the prior technology. In addition, the subject invention is found to require less lubrication material per unit area than is required by the prior art.

The amount of lubricating material which may be applied on a given substrate can vary over a relatively wide range. However, a preferred range of coverage for the lubricating material generally varies from about 2 percent to about 40 percent surface area, and more preferably from about 5 to 15 percent surface area, said surface area being measured by totalling the vertically projected areas (i.e. maximum cross-sectional areas) of said lubricating spheres. In general, it will be appreciated that the substrate to be lubricated has at least one surface thereof coated only to the extent that a minor portion of the surface is covered by the lubricating material. Furthermore, a major portion of the lubricating particles have diameters less than about 10 microns in diameter and the majority of the particles in the major portions have an average diameter on the order of about one micron.

The lubricating particles are of a size such that the average diameter to weight ratio is such that the particles assume a mist or cloud, are airborne, and substantially independent of gravity forces in a substantially quiescent atmosphere. In viewing the enclosure in which there is such a mist of said particles it is noted that the mist takes on the appearance of smoke or smoke-like suspension.

As used herein the term "substantially quiescent atmosphere" is used to denote an atmosphere such that lubricating particles having a given diameter to weight ratio would remain suspended in said atmosphere independently of forces of gravity.

As an indication of the application of our invention as shown in FIGS. 1-4, an apparatus in accordance with this invention was operated in which aluminum plate stock of about 12 inches wide and 0.014 inch thick was continuously passed, at a rate of about 85 feet per minute, through an electrostatic unit having a lower rectangular enclosure provided with two openings for the passage of finely divided lubricating material therethrough, and an upper enclosure having an electrostatic unit proper. The pair of openings in the lower enclosure were equally spaced from the advancing metal stock and situated so that the generated lubricating material was played fully over the surface of the advancing plate. The particles were carried by air currents through the slotted opening in the enclosure into the upper enclosure provided with the electrodes. The electrodes were spaced about 5 inches from the advancing stock and generally about 3 inches from the enclosure walls. It was found that proper operation was maintained when the slotted opening in the lower enclosure were about $\frac{1}{8}$ to $\frac{1}{4}$ inch in distance from the plate stock. The plate may be advanced through the enclosures by means well known to those skilled in the art. A direct current voltage of about 65,000 volts was connected between the grounded part and the insulated electrodes comprising the electrode wires. A paraffin wax was heated to a temperature of about 160° F., and drawn into six atomizers, maintained at that temperature, and the air flow was adjusted through each atomizer to about 150 cubic feet per hour. The wax in finely divided form issued into the lower enclosure and was carried via air currents into the upper enclosure where the material was precipitated upon the advancing metal plate at about 10 milligrams per square foot per side. The wax was consumed at approximately 100 gms., per hour. Generally, high voltage and low amperage power supply are preferred and impressed upon the electrodes in the electrostatic enclosure. It has been found that a small amount of AC electrical energy may be passed through the electrodes in order to melt any wax or lubricating material which deposit thereon as indicated in FIG. 2.

As the mist or cloud of fine solid spheres of lubricant migrate into the chamber 11, they move upwardly into and about the area between the wire grids 18 and the conductive substrate 24 which passes into the chamber via slot 39 and out of the chamber via slot 13. Because the articles are of such small size, gravity has a negligible effect on their movement and accordingly, movement of the particles upwardly into the area about the grid 18 is not inhibited thereby. Further, the slot openings 39 and 13 are maintained such that windage caused by the moving substrate has only a minimal effect on the substantially random distribution of the solid lubricant spheres. As the fine spherical particles collide with the relatively smaller ionized gas molecules, charge is transferred to the lubricating spheres which are then attracted to the surface of the substrate 24 as it moves through the chamber 11. The lubricant spheres moving into the chamber are substantially uniform sized spheres and tend to randomly disperse about the chamber and accordingly, when they become charged to a substantially uniform maximum charge level, they substantially uniformly disperse onto the conductive substrate 24 in a generally random manner to thereby provide a uniform distribution of the particles over the surfaces of the substrate 24. This uniformity of distribution of the particles over the surface of the substrate is insured because windage and spray currents do not disturb the generally random movement of the particles within the plasma as a charge is being acquired thereby. Further, and of substantial importance to the successful operation of this invention, is the fact that the particles are of such small size and are permitted to randomly move within the chamber 11, for sufficient time so as each acquire a relatively strong maximum charge which causes the particles to strongly adhere to the substrate while at the same time repelling one another to thereby prevent coalescing of the particles before and after they are attracted to the substrate.

It should be emphasized that once the particles are attracted to the surface of the conductive substrate, they will not coalesce and thereby form streaks of lubricant on the substrate since the spherical particles are each fully charged and accordingly strongly adhere to the substrate. Further, in the case where a lubricant normally solid at room temperature is utilized, the solid, dry spheres of lubricant provide point-to-point contact between respective layers of the conductive substrate whether the substrate is rolled in the form of a coil or cut into sheets and stacked on top of one another. Thus the spheres of lubricant have the load bearing qualities of conventional spherical bearings with air pockets therebetween so that respective layers of the substrate can be separated from one another in a simple and easy manner.

The quantity and relative density of the lubricating particles dispersed onto the conductive substrate is dependent only upon the quantity of particles migrating into the chamber 11 and the relative velocity of the conductive substrate (and hence its dwell time) as it passes through the precipitation chamber. Generally acceptable lubrication is achieved while the speed of the conductive substrate passing through the precipitation chamber may range from 25 feet per minute to 400 feet per minute or more and the quantity of solid lubricating particles is that generated by an air supply of from 25 cubic feet per hour per venturi orifice and up.

Various conductive substrates can be coated with lubricant in keeping with the present invention. Such substrates include but are not limited to aluminum, iron, steel, copper, tin and various alloys thereof. In addition, the lubricating apparatus of this invention may be used to lubricate various forms or configurations of metal since whatever the form of the metal, the dispersion of the lubricating particles onto the surface thereof will be substantially random and hence, uniform.

The direct current voltage which may be applied between the advancing metal substrate and the electrode means may vary over a wide range. In general, the distance between the metallic substrate and the electrode wires may be from about 1 inch to about 10 inches, preferably between about 3 and 6 inches. The potential difference between the ground and the electrodes may vary from about 10,000 to about 100,000 volts. In general, a preferred potential difference should be of the order of about 10,000 volts per inch. It is generally believed that the velocity of particles having average sizes less than 10 microns under influence of an electrical field of about 10,000 volts per inch would be an average velocity of about 0.5 feet per second within the enclosure.

Figure 13:
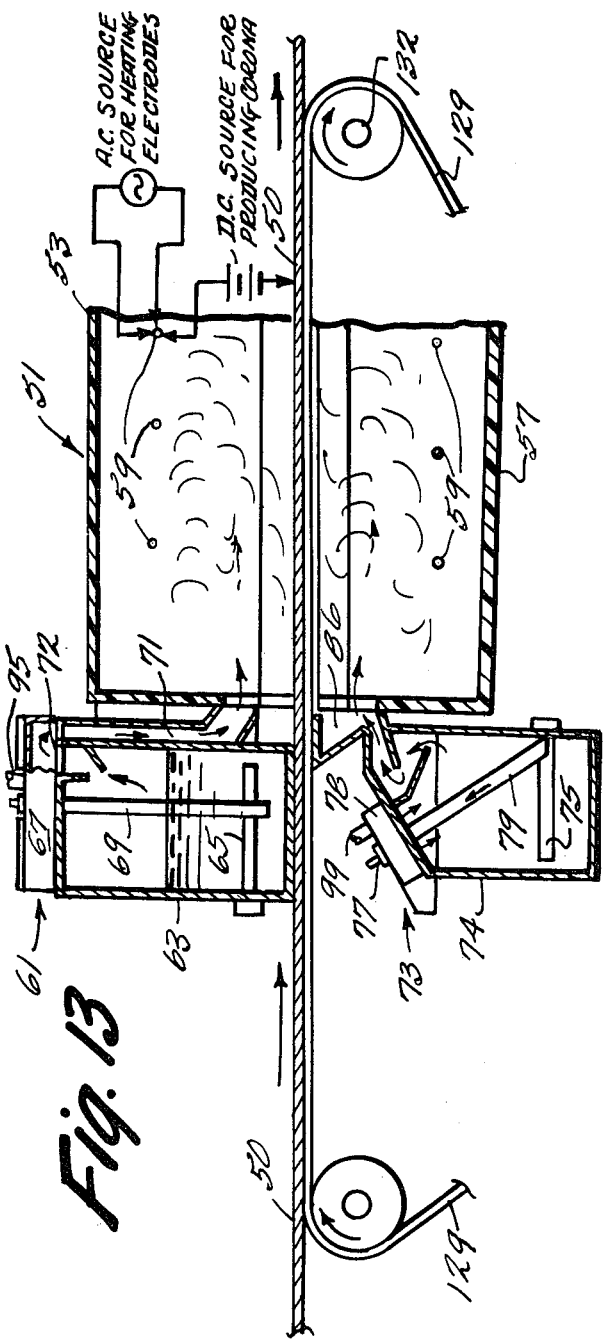
FIG. 13 is a schematic illustration of the exemplary process of applying fine particles of lubricant to a conductive substrate.

Refer now to FIG. 5 which is a side elevation view of an alternate presently preferred exemplary embodiment of the present invention. As illustrated, the lubricating apparatus includes a longitudinally partitioned, non-electrically conducting precipitation chamber 51 which preferably is formed of a plastic material such as polypropylene. The precipitation chamber 51 has an upper portion 53 which is above the plane 55 through which the conductive substrate passes and includes a lower portion 57 which is positioned below the plane 55. A plurality of transversely extending electrodes or wires 59 forming a grid on each side of the substrate are charged to a common potential with respect to the conductive substrate and are positioned transversely with respect to the direction of movement of the conductive substrate through the lubricator. The electrodes are spaced with respect to the conductive substrate by a suitable distance, e.g., five inches, on each side of the substrate and are spaced with respect to one another. An AC voltage is preferably superimposed across the length of individual wires 59 to heat the wires and thus prevent an accumulation of lubricant deposits on the wires. A schematic showing of such a heating arrangement may be seen in FIG. 13. It has been discovered that unless such heating of the electrodes is present, undesirable accumulations of lubricant materials often quite quickly build up on the electrodes thereby greatly decreasing the ionizing efficiency thereof.

An upper mist generator 61 is illustrated which in the preferred embodiment is sectioned into a plurality of transversely aligned mist generating units, one associated with each partitioned chamber within the precipitation chamber 51. Each section of the mist generator 61 includes a reservoir 63 which contains the lubricant material to be dispersed onto the upper surface of the conductive substrate. Preferably, the lubricant is solid at room temperature and accordingly, a heating element 65 is positioned within the reservoir in order to heat the lubricant to a liquid state. As will be explained more fully hereinbelow, air or another suitable gas supply is coupled to a venturi atomizer 67 which is positioned in the upper portion of the mist generator. The passage of air under pressure into the venturi causes a pressure drop at the top of feedline 69, thereby causing the liquified lubricant to be sucked up into the venturi where the lubricant is sheared into individual droplets. The droplets then drop downwardly into the reservoir 63 where the larger droplets are returned to the bath of liquid lubricant. The remaining droplets in the mist migrate through a baffle filter arrangement (see FIG. 7) into the air flow outlet chamber in the upper portion of the mist generator and then through a channel 71 into the precipitation chamber 51. The baffle filters out relatively large particles so that only particles of sufficiently small size, e.g. on the order of 10 microns in diameter or less, and the majority on the order of one micron migrate into the precipitation chamber. The migration of the tiny spherical particles is so slow that during this migrating process, the particles solidify and become dry rollers 121 in order to give the substrates passing through the lubricator added momentum for ease of stackability in the case where individual sheets of metal are being lubricated. As the conductive substrate passes through the lubricator and particularly through the precipitation chamber 51, the substrate is supported and guided by means of a plurality of belts 129 which are driven by the motor 127 via a chain drive assembly 131. Each of the belts 129 is relatively thin so that only a small portion of the total surface of the conductive substrate passing through the lubricator will be contacted by the belts 129 and accordingly, only a small portion of the total surface area of the substrate will not have a lubricant dispersed thereon.

Figure 6:
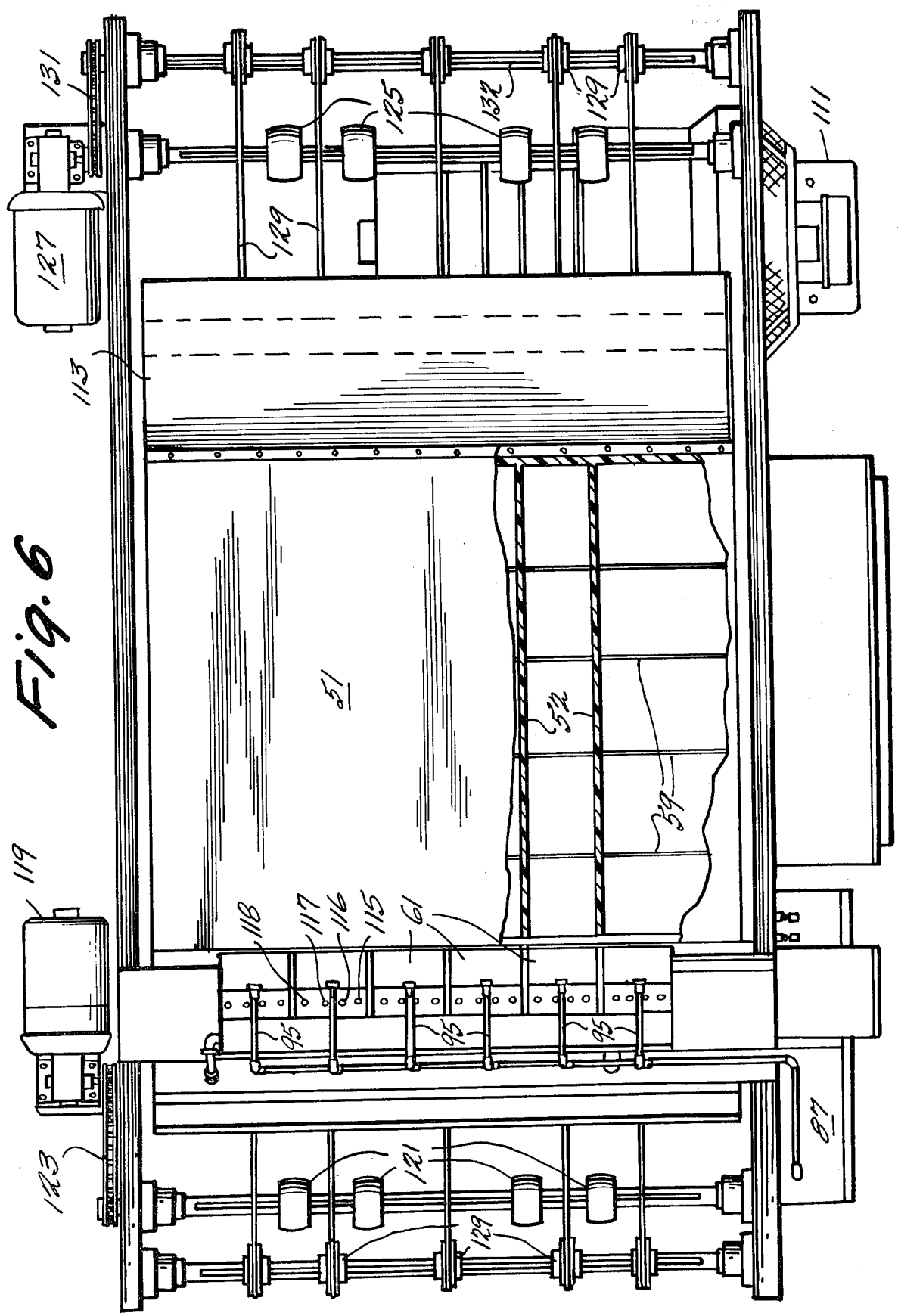
FIG. 6 is a plan view of the preferred exemplary lubricating apparatus illustrated in FIG. 5 shown in partial section.
Figure 8:
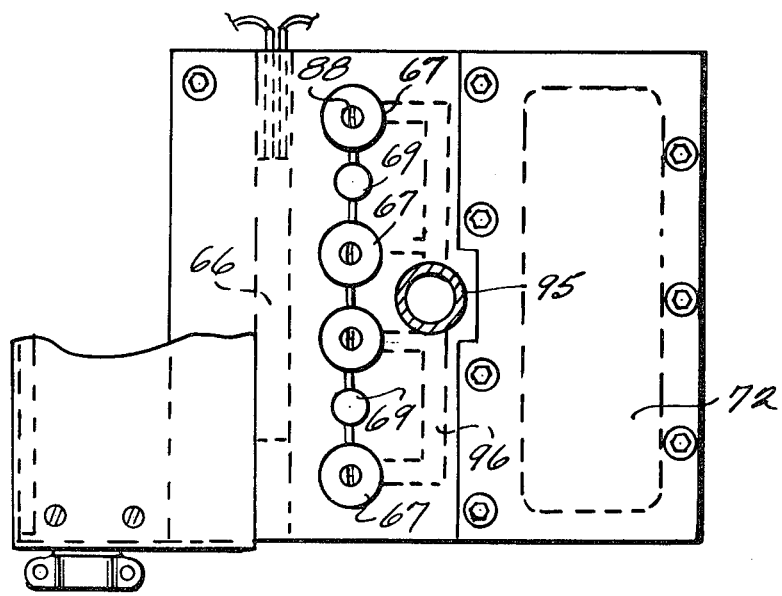
FIG. 8 is a partial plan view of the upper mist forming exemplary apparatus illustrated in FIG. 7.
Figure 7:
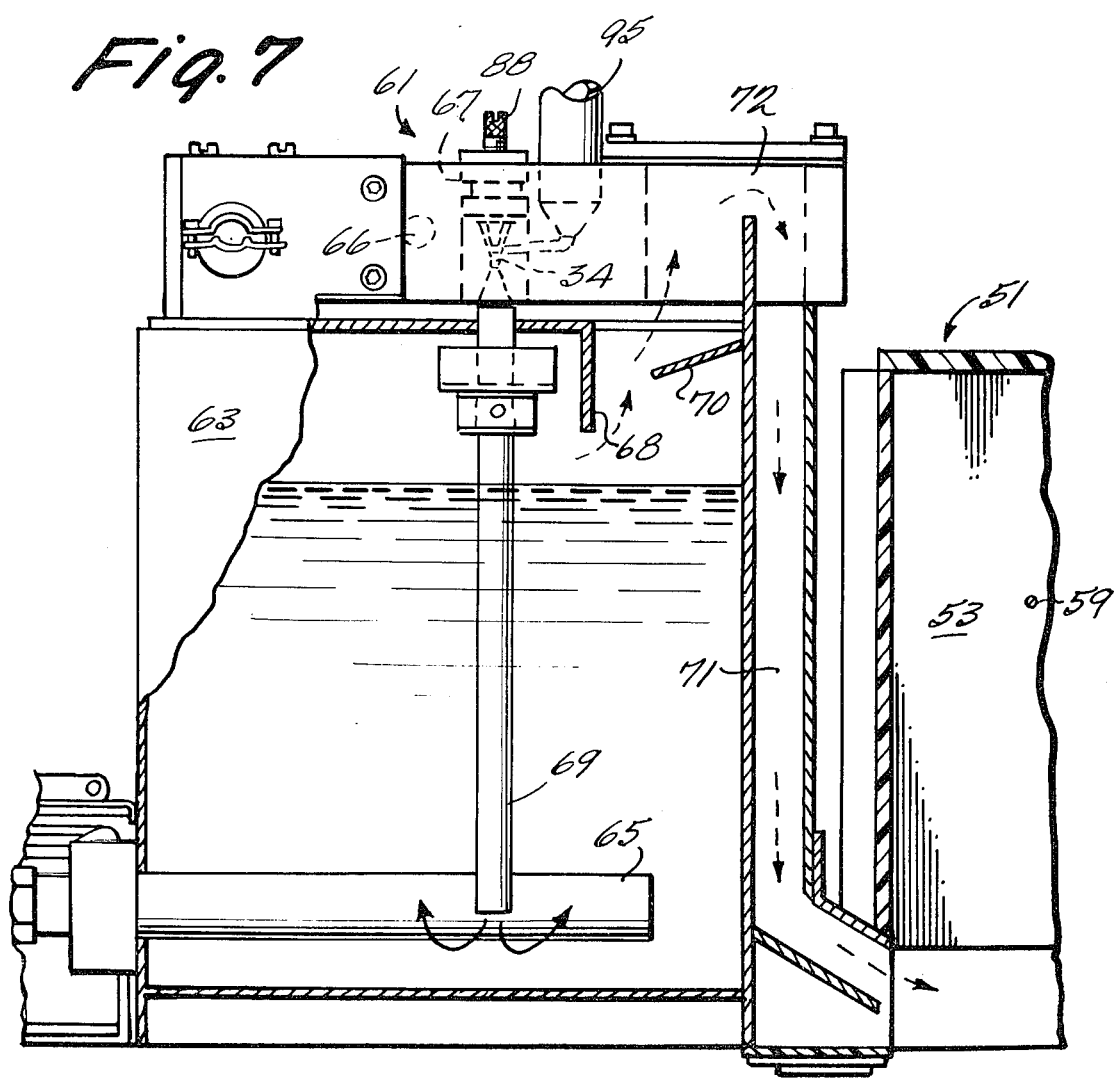
FIG. 7 is an elevation view shown in partial section of the upper mist forming exemplary apparatus of the present invention.
Figure 11:
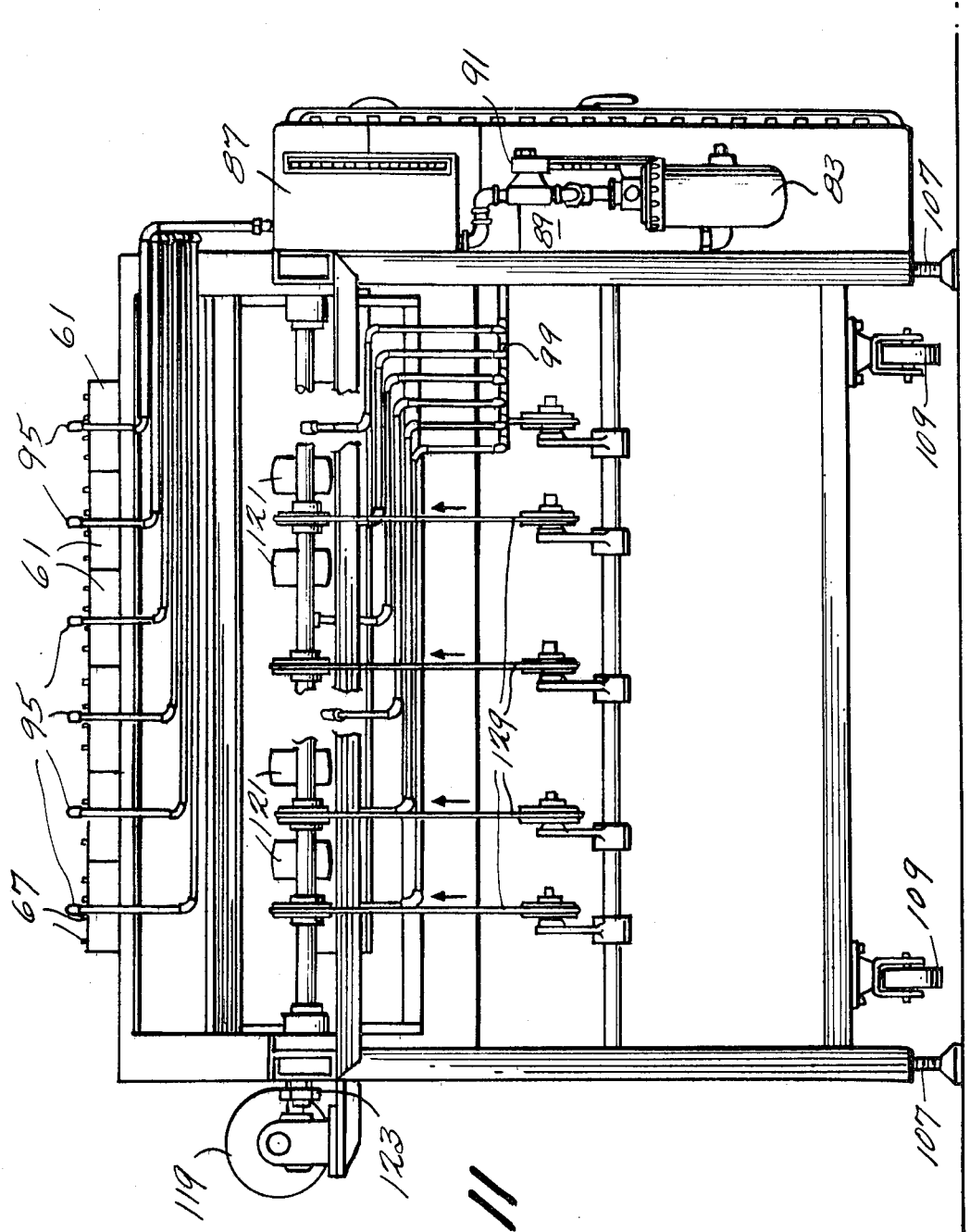
FIG. 11 is an entrance end view of the lubricating apparatus of the preferred exemplary embodiment of the present invention.
Figure 12:
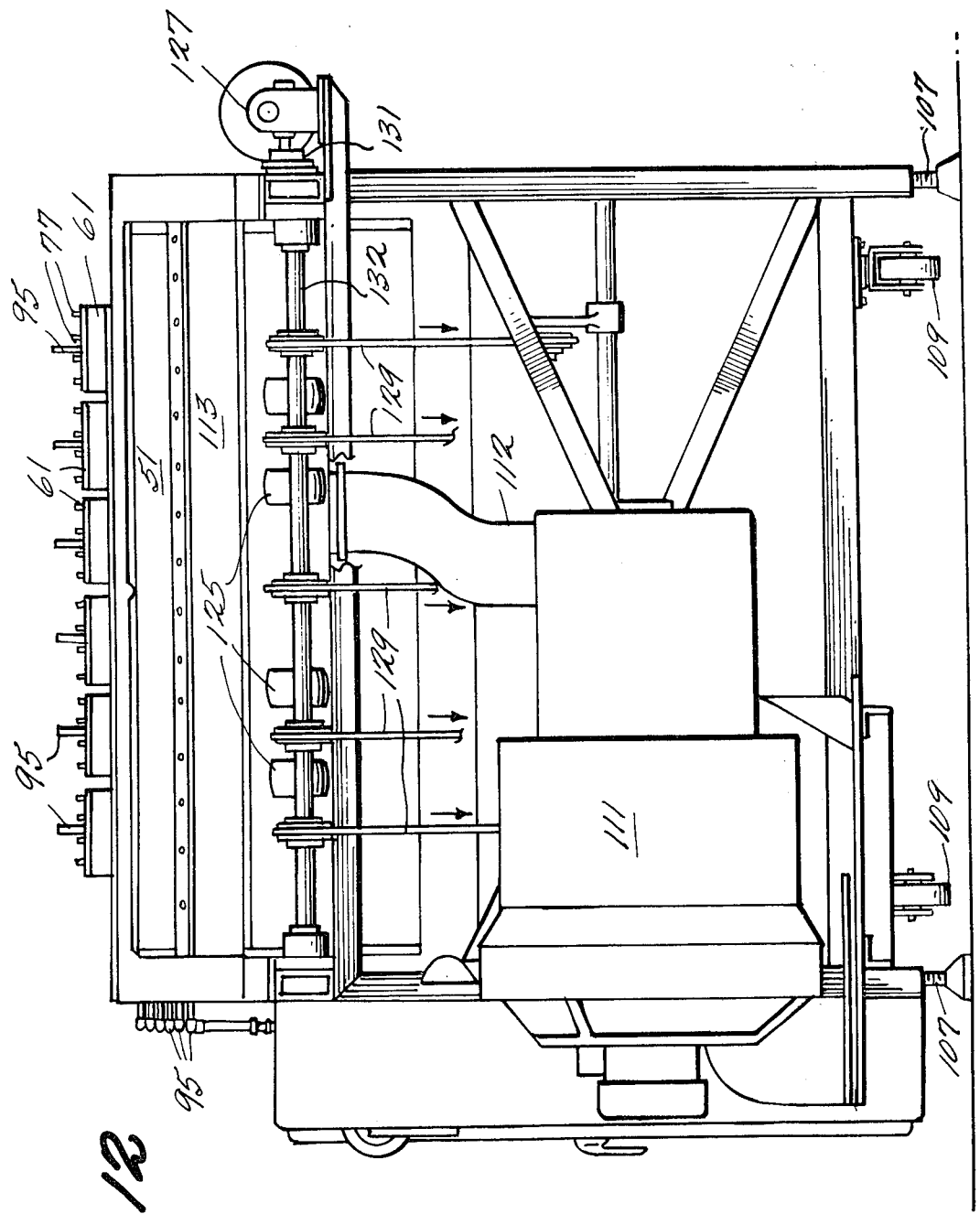
FIG. 12 is the exit end view of the lubricating apparatus of the preferred exemplary embodiment of the present invention.

Refer now to FIGS. 7 and 8 which illustrate in greater detail the individual upper mist generators 61 illustrated in FIGS. 5 and 6. With specific reference to FIG. 7, the individual mist generators each include a reservoir portion 63 at the bottom thereof. The reservoir contains a lubricant which preferably is a solid at room temperature. Accordingly, a heater 65 of conventional design is positioned within the reservoir 63 proximate the bottom thereof. The heat generator is appropriately energized in a conventional manner to maintain the lubricant in a liquid state during operation of the lubricator. At the top of the reservoir is positioned a plurality of venturi atomizers 67. Air or any other suitable gas under pressure is coupled to each of the venturi atomizers from the associated distributor conduit 95 via distributor passages 96. In addition, a plurality of feed lines 69 are provided through which the liquified lubricant is drawn upwardly and into the venturi atomizers. In the preferred embodiment there are four venturi atomizers and two feed lines in each mist generator with each feed line supplying liquid lubricant to two of the venturi atomizers as illustrated in FIG. 8. The venturi atomizers may be of conventional design but preferably are of the same design as the venturi atomizer illustrated in FIG. 4. A coarse air flow control 88 is provided for each venturi atomizer for shutting off the air flow therethrough if desired. As aforementioned, the lubricant is preferably solid at room temperature and accordingly, a heating element 66 is provided in the upper portion 65 of the mist generator 61 in order to maintain the lubricant in a liquified state as it passes upwardly through the feed line 69 and into the venturi atomizer.

With reference to the exemplary venturi atomizer of FIG. 4, the air passage 25 has a diameter on the order of 0.05 inch and accordingly, even though the relative volume of air flowing into the mist generator 61 is small, the velocity of the air passing through the nozzle 25 and into the throat 34 of the venturi atomizer is quite high. Hence, the pressure at the throat of the venturi nozzle is sufficiently reduced to draw upwardly in the feed line 69 a sufficient amount of lubricant to cause a continuous shearing of the lubricant into fine droplets. For larger size venturis it may be desirable to actually force pump liquid lubricant to the orifice to obtain an increased production quantity of particles therefrom. The droplets are then forced downwardly into the reservoir 63 under the force of the air flowing through the throad of the venturi and under the force of gravity. The larger droplets which are still in the liquified state drop into the bath of lubricant in the reservoir while finer droplets having a diameter on the order to 20 microns or less and preferably much less than 10 microns form a cloud or mist of particles in the upper portion of the reservoir 63. These fine droplets migrate about a first baffle 68 and a second baffle 70 into an air flow outlet box 72 positioned in the upper portion 65 of the mist generator. The baffles 68 and 70 tend to disperse the air flow and the fine lubricating droplets so that their distribution across the width of the mist generator is substantially uniform and random in nature. In addition the baffles 68 and 70 filter out relatively large droplets which having a greater momentum than smaller particles can not negotiate the tortuous path through the baffles and instead strike the baffles and fall back into the bath. The fine small diameter droplets which pass upwardly into the box 72 have such a small size that they move upwardly substantially independently of the force of gravity. Applicants have found that only about 5 to 10% of the droplets formed by the venturi atomizers 67 have sufficiently small size to migrate upwardly past the baffles and into the box 72 with the remaining droplets falling back into the liquid lubricant bath. After the particles have moved into the box 72, they migrate downwardly through passage 71 which exits into the upper portion 53 of the precipitation chamber 51. The droplets as they migrate through passage 71 are still substantially in liquid form. However, in the case of the preferred lubricant which is solid at room temperature, because of their low heat capacity, as they pass into the precipitation chamber the droplets solidify and dry, thereby taking on the characteristics of round, solid bearings. The droplets pass into the chamber 51 and form therein a cloud of randomly dispersed lubricating spheres which are not attracted to the metal substrate passing therethrough until the droplets acquire a sufficiently great charge. The migration of the cloud of lubricating spheres into the chamber 51 is assisted by the relatively low volume air flow passing through the venturi 67 and into the upper portion of the reservoir 63. As aforementioned, the electrodes or corona discharge wires 59 positioned within the chamber 51 ionize the atmosphere therein due to a voltage maintained between the electrodes and the metal substrate, thereby creating a plasma of ionized ambient gaseous molecules about the electrodes 59. This ionized atmosphere in turn multiply collides with and thus imparts a substantially uniform maximum charge to the fine but relatively larger spherical lubricating particles migrating into the chamber to thereby cause the charged lubricating particles to be attracted to and uniformly and randomly dispersed unto the conductive substrate passing therethrough.

Refer now to FIGS. 9 and 10 which illustrate one of the mist generators positioned on the underside of the conductive substrate passing through the lubricator. As illustrated, the lower mist generators each includes a reservoir 74 which contains a lubricant which is liquified by means of a heating element 75 of conventional design. Positioned above the reservoir 74 is a mist forming portion 78 having a plurality of venturi atomizers 77 positioned therein. Air under pressure is coupled to each of the venturi atomizers 77 via distributor conduit 99 as illustrated in FIG. 10. In addition, a pair of feed lines 79 are provided which extend downwardly into the bath of lubricant at one end and which are coupled to a passageway leading to the throat of two venturi associated therewith at the other end. A second heating element 80 is positioned within the upper portion of the mist generator for maintaining the lubricant in a liquid state as it passes into and out of the venturi atomizer 77.

In operation as air under pressure is forced into the throats of the venturi atomizers, lubricant is drawn and accordingly undertake the characteristics of hard, solid spheres. The particles enter the precipitation chamber 51 in the form of a cloud which is substantially uniformly distributed across the width of each longitudinally partitioned section or portion of the chamber.

A second series of transversely aligned mist generators 73 are positioned on the underside of the plane 55 along which the conductive substrate passes. The second set of mist generators each includes a reservoir 74 which contains the lubricant to be applied to the underside of the conductive substrate. A heater 75 is illustrated for maintaining the lubricant in its liquid state. A venturi atomizer 77 is positioned at the top of the reservoir and includes a venturi through which air under pressure passes. As the air under pressure passes through the venturi, the liquified lubricant is sucked up through feedline 79 and is sheared into droplets by the air passing through the throat of the venturi. The larger droplets fall back downwardly into the liquid bath while smaller particles not affected by gravity tend to flow through a zig-zag path 81 defined by a set of baffle filters into the lower portion 57 of the precipitation chamber 51. These particles migrate quite slowly into the precipitation chamber 57 and accordingly, because of the low heat capacity thereof, solidify in the case of the preferred lubricant which is a solid at room temperatures. Because of the migration of the particles into the chamber 57 and the small size of the particles, its particles each acquire a strong charge, i.e. a relatively large charge to mass ratio. Thus, the particles not only tend to be randomly dispersed before being charged but also are randomly and uniformly dispersed onto the conductive sheet passing through the chamber after being charged. Thus, a substantially uniform distribution of the solid spheres on the conductive substrate is achieved.

Air supply for shearing the liquid lubricant in the throats of the venturis 67 and 77 is coupled to the lubricator via an air filter 83. After the air has passed through the air filter 83, it passes through an air pressure regulating valve 85 and then into upper and lower air flow distributors 87 and 89, respectively. The air coupled to each of the flow distributors 87 and 89 is controlled by meter valves 91 and 93, respectively. Thus, for example, the total air flowing into air flow distributor 87 is controlled by meter valve 91. The air passing into the distributor 87 is coupled to each of six distributor conduits 95 via flow metering valves (not shown) of conventional design. Each of these conduits is coupled to an individual upper mist generator 61. In addition, the air flow coupled to the lower distributor 89 is controlled by meter valve 93 with the distributor 89 coupling air to each of a plurality of distributor conduits 99 via flow metering valves. Each of the flow metering valves is manually adjustable to control the air flow into the conduits 95 (not shown). The conduits 99 couple the air under pressure to each of the plurality of individual mist generators 73 positioned on the underside of the substrate which passes through the lubricator.

The conductive substrate is fed into the lubricator via a powered friction roller drive and is then passed along the plane 55 within the lubricator by means of a belt drive 129. The substrate is passed out the exit end 103 of the lubricator and onto an output friction roller drive. The substrate being lubricated may be in the form of individual sheets, a coil which is unravelled as it passes through the lubricator and is then wound up at the output end of the lubricator, an endless strip in a strip line manufacturing environment, or may be in any other suitable form as will be appreciated by those in the art. The lubricator itself is of relatively small size and, as illustrated, can be easily moved from place to place by retracting the supports 107 so that the lubricator is supported by the rollers 109. As shown to approximate scale in the drawings, the FIG. 5 lubricator has an overall width of about 68 inches, a height from the floor to the pass line of the sheet metal of about 45 inches and an overall length of about 8 feet, 2 inches.

In the case where no conductive sheets are being passed through the lubricator, a blower 111 positioned at the output end of the lubricator is activated and is coupled to an outlet chamber 113 which is positioned at the outlet end of chamber 51 about the upper and lower portion of the plane 55 through which the substrate passes. The blower collects and filters out of the ambient air the lubricating spheres which, of course, are not deposited on a substrate at such times since no substrate is then passing through the precipitation chamber 51. It should be understood, of course, that when a conductive substrate is passing through the precipitation chamber 51, substantially all of the particles are electrostatically dispersed onto the substrate and accordingly, the blower 111 is not activated when the lubricator is in normal operation.

Refer now to FIG. 6 which is a plan view of the lubricator of the present invention shown in partial cutaway. The precipitation chamber 51 formed of a suitable plastic material is shown divided or partitioned longitudinally into a plurality of sections or chambers by means of longitudinally extending partitions 52. The electrodes or corona discharge wires 59 are illustrated extending transversely with respect to the longitudinally oriented chambers. At the inlet end of the precipitation chamber are a plurality of mist generators 61, each one associated with an individual partition or chamber of the precipitation chamber 51. Each mist generator is illustrated (see FIG. 7) having a separate air flow distributor conduit 95 coupled thereto for supplying air to its respectively associated venturi atomizer 67 and for forcing the sheared lubricant droplets downwardly into the reservoir 63 positioned therebelow. In the preferred embodiment, each mist generator actually has four controllable venturi atomizers 115-118 to which the air from the conduit 95 is coupled. Each venturi, as will be seen hereinbelow, generates fine lubricating spheres which are migrated into the precipitation chamber 51. By having the precipitation chamber 51 partitioned as illustrated, swirling of the air and lubricating particles from one side of the chamber to the other is prevented and accordingly, a random uniform distribution of the lubricating spheres on the conductive substrate is insured. Further, because the entire chamber housing is non-conductive, the charged lubricant particles move freely within the chamber without becoming attracted to the housing. Because of this the particles within the chamber continue to acquire charge until the particles acquire sufficient charge to become accelerated toward the substrate.

At the input side of the lubricator the conductive substrate is fed into the precipitation chamber 51 via friction rollers 121 which are driven by a motor 119 via a chain drive assembly 123. At the outlet side of the lubricator, a second set of friction drive rollers 125 driven by motor 127 pulls the conductive substrate away from the lubricator. Preferably, the friction rollers 125 are driven at a faster rate than the input friction upwardly through the feed lines 79 and into each of the venturi atomizers. The lubricant is then sheared into droplets which are forced downwardly into the upper portion of the reservoir 74 by the force of the air acting thereagainst and under the force of gravity. The larger droplets which typically constitute 90 to 95% of the total droplets formed, drop back into the bath of lubricant while the remaining droplets, preferably having a diameter of less than 10 microns, migrate past baffle 82 and about a second baffle 84 into a passageway 86. The baffles 82 and 84 cause the droplets to become randomly distributed across the width of the mist generator and at the same time reduces the speed of movement of the droplets as they move out of the reservoir 74. In addition, the baffles filter the larger particles out of the mist to thereby reduce the average size of the particles migrating into the chamber 51. The passage 86 has a large exit area in order to further reduce the speed of the droplets so that as the droplets enter the lower portion 57 of the precipitation chamber 51, the movement thereof is migratory in nature with the droplets forming a slow moving cloud of randomly dispersed solid spheres of lubricant. These small dry spheres of lubricant are subsequently ionized and randomly dispersed onto the substrate moving through the precipitation chamber.

A coarse control 88 is provided for controlling the air flow through the throat of each of the venturi atomizers 77. Thus, for example, if it is desired to shut off one or more of the atomizers, a simple turning of the control 88 will shut off the flow of air through the venturi. This control is provided in addition to a fine control for each individual mist generator. It is contemplated that these and/or similar controls will be either manually or automatically manipulated to control the air supply, i.e., pressure or volume metering, etc., to the orifices and/or the number of such orifices in operation to thereby control the quantity of lubricating spheroids produced per unit time and delivered to the coating chamber.

Refer now to FIG. 11 which is a view of the entrance end of the lubricator of the present invention. As illustrated, a motor 119 is fixedly secured to the side of the lubricator and drives a plurality of friction rollers 121 via a chain drive system 123. The friction rollers 123 pull the conductive substrate into the lubricator for applying the solid lubricating particles to the surfaces thereof. A belt drive arrangement is provided having a plurality of belts 129 which are driven by the motor 127 at the opposite end of the lubricator. Thus, the belts 129 support the conductive substrate as it passes through the lubricator and in addition assist in conveying the substrate as it passes through the precipitation chamber 51. The belts each pass under the lubricator and then upwardly in the direction illustrated by the arrows and then into and through the precipitation chamber 51. At the top of the lubricator is positioned a plurality of individual mist generators positioned alongside one another for generating the tiny solid spherical droplets which are dispersed onto the conductive substrate. A plurality of distributor conduits 95 conduct air under pressure from a distributor box 87 to each of the individual mist generators 61. The air flow into the distributor box 87 is controlled by means of a meter valve 91. The air filter 83 for filtering the air coupled to each of the venturi atomizers is also illustrated.

Refer now to FIG. 12 which is an exit end view of the lubricator of the present invention. As illustrated, a motor 127 drives a plurality of friction rollers 125 which pull the metal substrate out of the precipitation chamber 51. In addition, motor 127 drives a plurality of drive belts 129 via a chain drive assembly 131 and an axle 132. The drive belts pass outwardly from the precipitation chamber 51 and downwardly as illustrated by the arrows and then under the lubricator to the front end thereof as illustrated in FIG. 11. As aforementioned, these belts guide the conductive substrate through the precipitation chamber.

Additionally, in case no conductive substrate is being passed through the lubricator, the lubricating spheres passing into the precipitation chamber 51 will not be attracted to any surface because of the non-conducting makeup of the precipitation chamber 51. Accordingly, a blower 111 is provided for drawing the spherical lubricating particles out of the chamber 51 through an exhaust conduit 112 and into an appropriate recovery vessel. It should be understood that the blower 111 is not used when a conductive substrate is being passed through the precipitation chamber 51 since substantially all of the fine spherical particles of lubricant formed are randomly dispersed onto the substrate as it passes therethrough. Accordingly, such a blower is not required during normal operation of the lubricator.

The operation of the lubricator of the present invention will now be described in conjunction with FIG. 13 which is a simplified schematic illustration of a portion of the lubricating apparatus of the present invention. A conductive substrate 50, which may be of any suitable material such as, for example, aluminum, iron, steel, copper, tin and various alloys thereof, is guided through the lubricator and in particular the precipitation chamber 51 by means of a plurality of belts 129 spaced across the width of the lubricator. The substrate is passed through the lubricator at any appropriate speed such as, for example, 45 feet per minute upwards to 300 feet per minute or more. As the substrate passes into the precipitation chamber 51, the slot therethrough for receiving the belts 129 and the substrate 50 is relatively small in order to contain the desired spherical particles of lubricant substantially totally within the precipitation chamber 51. At the same time as the substrate is moving through the lubricator, air under pressure is coupled to each of the distributor conduits 95 and 99 associated with the upper and lower mist generators 61 and 73, respectively. The pressurized air is then conducted through the venturi atomizers 67 in the upper mist generators which in turn causes liquid or liquified lubricant to be drawn upward into feed lines 69 and into the throats of the venturi 67. The resulting droplets thus formed are forced downwardly into the upper portion of the reservoirs 63 with the great majority of the droplets falling back into the lubricant bath. However, a small portion of the droplets, on the order of 5 to 10% thereof, migrate past a baffle filter arrangement including baffles 68 and 70 (see FIG. 7) and upward into an outlet air flow box 72 positioned in the upper portion of the mist generator. The baffles act as a filter which eliminates the relatively large droplets but which permits passage of the relatively small droplets into the box 72. In addition, the baffles and the air flow outlet box 72 slow down the movement of the tiny particles of lubricant and cause the particles to be uniformly and randomly distributed across the width of the mist generator. The mist then passes from the outlet box 72 into a passage 71 with the droplets still being substantially in liquid form. As the droplets migrate into the chamber 53 above the substrate 50, the droplets, if solid at room temperature, solidify into tiny hard spherical lubricant particles having diameters which range between 1 micron and 10 microns (most may be on the order of one micron) and which slowly move into and about the chamber 53 to form a cloud of particles substantially uniformly spread across the width of each partition chamber within the upper portion of the precipitation chamber 51.

At the same time, the grid of interconnected electrodes is appropriately charged with respect to the substrate so that a sufficient corona current is provided to ionize the surrounding atmosphere and to overcome space charge effects which might be imposed by the relative concentration of the particles passing into the chamber and any previously implanted coating on the substrate. The charging of the atmosphere surrounding the electrodes 59 results in the formation of a plasma which in turn multiply collides with and charges the relatively larger lubricant particles as within the chamber. The particles continue to randomly migrate about the chamber as they continue to acquire charge. When the particles are sufficiently charged, i.e., the particles have a relatively large maximum charge to mass ratio, they are attracted to the surface of the substrate 50 and are dispersed thereon in substantially a uniform random distribution. Because the particles are small and hence have little momentum, they tend to repel one another as they move within the chamber. Accordingly, coalescing of the particles does not occur and the particles tend to be spaced from one another after being attracted to the substrate. This insures a substantially random distribution of particles on the substrate.

In the underside of the substrate 50 is a second series of mist generators 73 which, as aforementioned, generate a plurality of lubricant droplets, the great majority of which drop back into the lubricant bath in the reservoir 74. However, those droplets of lubricant which have sufficiently small size, that is, a diameter ranging between 1 micron and 10 microns (most on the order of one micron) are not affected by gravity and have a tendency to migrate about the filter baffles 82 and 84 (see FIG. 9) and into an outlet chamber 86 which is of sufficiently large size to slow down the movement of the particles while the baffles 82 and 84 cause the particles to become randomly distributed across the width of the mist generator. The resulting cloud of spherical lubricant particles migrating into the lower portion 57 of the precipitation chamber 51 form a cloud of particles which are substantially uniformly distributed across the transverse width of each of the partition chambers within the precipitation chamber 51. These particles, after collisions with the plasma created by the electrode grid 59 become charged to the same polarity as the grid in the upper portion 53 of the chamber and thus cause the spheroids to be attracted to the substrate 50. The particles are dispersed randomly and uniformly across the width of the substrate 50 as it passes through the precipitation chamber 51.

With reference to FIG. 14, a photograph is shown of a portion of a substrate after having the solid lubricant spheres dispersed thereon with the portion of the substrate photographed magnified 1,000 times. As can be seen, the solid droplets are randomly distributed over the surface of the substrate and have not coalesced together paticularly because of the like charge each particle acquires as it is attracted to the substrate 50. The substrate illustrated in the photograph is a tin plate which was passed through the precipitation chamber 51 at 300 feet per minute. In addition, 50 cubic feet per hour of mist producing air was passed into each of the mist generators and consequently into the precipitation chamber 51.

FIG. 15 is a photograph of a portion of a tin substrate surface magnified 1000 times illustrating the solid, dry, spherical lubricant particles substantially randomly distributed thereacross. To obtain the article of manufacture shown in this photograph, the tin substrate was moved through the precipitation chamber 51 at only 45 feet per minute as opposed to the 300 feet per minute rate used for the photograph of FIG. 14. Accordingly, the distribution of the solid spheres on the surface of the substrate is substantially denser. However, in each case it is noted that no coalescing of the particles occurs and that the particles are substantially randomly and uniformly distributed over the surface area photographed. The small particles illustrated (the majority of all particles) are on the order of 1 micron in diameter while it is estimated that the few largest particles shown have a diameter on the order of 4 of 5 microns.

While the number of particles per unit area dispersed onto the surface of the substrate is dependent primarily only upon the number of fine solid particles migrating into the chamber 51 and the relative velocity (and hence dwell time) of the substrate through the precipitation chamber, it should also be understood that the percent of the substrate area covered is also related to the size of the particles and/or to the weight in milligrams of the particles deposited on a unit area of the substrate. Thus for the same given weight of lubricant deposited on a unit area of the substrate, particles having a diameter of one micron will cover twice the area of particles having a diameter of two microns and four times the area covered by particles having a diameter of four microns, and so on. Accordingly, it can be seen that be reducing the size of the solid particles deposited on the substrate, substantial quantities of lubricant can be conserved for a given desired percentage coverage of the substrate. This is an additional reason why the size of the spherical droplets is controlled by the baffles in the mist generators and by the design of the venturi atomizer illustrated in FIG. 4 so that only the very tiny particles having a diameter of less than ten microns and the majority being on the order of one micron are permitted to pass into the precipitation chamber 51.

In the above described preferred FIG. 5 embodiment it has been observed that mean lubricating particle velocities within chamber 51 are only on the order of 0.5 feet per second. Furthermore, with line speeds on the order of 300 feet per minute, controlled dispersions of lubricating particles on the order of 4-24 milligrams per square foot (+20% tolerance) have been obtained by controlling the number of mist generator venturis in operation (control valves 88) and/or by controlling the quantity of particles generated by each venturi such as, for example, by controlling the air pressure and flow thereto. As should now be apparent, manual or automatic controls can be effected to increase lubrication generation to accomodate line speed changes of the moving substrate. Since there are locations in most production lines where a designed line speed is nominally maintained, it may only be necessary to increase particle generation in steps (e.g., by turning controls 88 "on" and "off"). Thus, for example, there could be four steps in all triggered automatically by a tachometer electrical signal proportional to line speed. It is believed that line speeds up to as much as 1,200 feet per minute can be accomodated with reduced weights of lubrication per unit area and/or increased variances from a nominal application rate. However, since the lubrication produced by the teachings of this invention are of increased uniformity of smaller sized particles, etc., it has been discovered that the percentage coverage or weight per unit area of lubrication on the substrate may be significantly reduced from what was in the past considered necessary for proper lubrication using other methods which produce a lubrication film rather than the dispersed spheroid coverage of this invention.

Since the lubricated metal product of this invention is often ultimately used as a food or beverage container, it is important that the applied lubricant not produce an "off-taste" in the food or beverage. In this regard, experience has shown that care must be taken not only with the type of lubricant being used but also with the metal or other components of the lubricator with which the lubricant comes into contact during the application process. In this regard, it is presently preferred that the metal portions of the mist generator (e.g., the venturi, etc.) be made of brass, steel and/or aluminum.

At the present time, 0.05 inch venturi orifices have been used with the air supplied thereto at 10–30 pounds per square inch pressure to obtain respectively corresponding air flows through each venturi on the order of about 0.8–1.4 cubic feet per minute.

It is also possible to calculate the number of lubricant spheres needed for a given weight per square foot, depending on sphere size and/or to calculate the percentage of the total area actually covered by the spheres for a given weight per unit area. For these exemplary calculations, let:

S = 0.84 the density of an exemplary wax lubricant in grams per cubic centimeter
B = 12 inches converted to centimeters
R = particle radii from in centimeters
W = weight per square foot in milligrams
N = total number of spheres of wax per square foot at a given weight by the weight of a single sphere, at a given size.
A = area covered by wax spheres, calculated by multiplying the total number of spheres by the area of one sphere ($\pi R^2$).
C = percentage coverage Where:
$N = w/((4/3) \cdot \pi \cdot R^3 \cdot S \cdot 10^3)$
$A = N \cdot \pi \cdot R^2$
$C = (A/B^2) \cdot 100$ Then the following results:

| MICRONS DIA | MG/FT² | NUMBER OF SPHERES IN MILLIONS | PERCENT COVERAGE |
|---|---|---|---|
| 4. | 4 | 142 | 1.9 |
| 4. | 8 | 284 | 3.8 |
| 4. | 12 | 426 | 5.8 |
| 4. | 16 | 568 | 7.7 |
| 4. | 20 | 710 | 9.6 |
| 4. | 24 | 852 | 11.5 |
| 5. | 4 | 72 | 1.5 |
| 5. | 8 | 145 | 3.1 |
| 5. | 12 | 218 | 4.6 |
| 5. | 16 | 291 | 6.2 |
| 5. | 20 | 363 | 7.7 |
| 5. | 24 | 436 | 9.2 |
| 6. | 4 | 42 | 1.3 |
| 6. | 8 | 84 | 2.6 |
| 6. | 12 | 126 | 3.8 |
| 6. | 16 | 168 | 5.1 |
| 6. | 20 | 210 | 6.4 |
| 6. | 24 | 252 | 7.7 |
| 7. | 4 | 26 | 1.1 |
| 7. | 8 | 53 | 2.2 |
| 7. | 12 | 79 | 3.3 |
| 7. | 16 | 106 | 4.4 |
| 7. | 20 | 132 | 5.5 |
| 7. | 24 | 159 | 6.6 |
| 8. | 4 | 17 | 1 |
| 8. | 8 | 35 | 1.9 |
| 8. | 12 | 53 | 2.9 |
| 8. | 16 | 71 | 3.8 |
| 8. | 20 | 88 | 4.8 |
| 8. | 24 | 106 | 5.8 |

Even though only very low percentages of the substrate are actually covered by the lubricant, it has been discovered that this is nevertheless sufficient, for instance, for lubricating dies used to form shaped metal (e.g. cans) from the thusly lubricated metal substrate.

While the present invention has been disclosed in connection with only a few exemplary embodiments thereof, it should be understood by those in the art that there may be other variations of the preferred embodiment which fall within the spirit and scope of the appended claims.

What is claimed is:

1. A new article of manufacture comprising:
an aluminum substrate havin two opposing metallic surfaces on respectively opposite sides thereof; and substantially uniformly dispersed discrete particles of lubricating material having an average diameter of less than 10 microns, electrostatically spaced apart and distributed over at least one of said metallic surfaces so that from about 1 percent to about 15 percent of the surface is covered with lubricating material in an amount from 4 milligrams per square foot to about 24 milligrams per square foot by the process of forming the particles from a dielectric lubricating material, electrostatically charging said particles so that the charged particles mutually repel one another, maintaining a quiescent cloud of such charged particles adjacent said at least one of the metallic surfaces and depositing and distributing the particles on said surface while so charged substantially entirely by electrostatic forces.

2. A new article of manufacture as in claim 1 wherein said particles are substantially spheroidally shaped and a substantial majority of said particles have diameters on the order of one micron in size.

3. A new article of manufacture as in claim 2 wherein said particles are similarly distributed over both said metallic surfaces.

4. A metallic substrate as defined in claim 1 wherein said lubricating particles are substantially solid spheres of a dielectric hydrocarbon and a major portion have diameters less than about 10 microns in diameter and the majority of particles in said major portion have an average diameter on the order of one micron.

5. An aluminum substrate having a surface thereof coated with a distribution of lubricating particles, a major portion of said paticles having diameters less than 10 microns, said lubricating particles being substantially spheroidal in shape and comprised of a solid dielectric hydrocarbon selected from a group consisting of paraffin wax, petrolatum, and microcrystalline wax, said particles being spaced from one another by mutual electrostatic repulsion while being electrostatically deposited to cover less than about 10 percent of the surface with solid dielectric hydrocarbon spheres in an amount from about 4 milligrams per square foot to about 24 milligrams per square foot.

* * * * *